(12) United States Patent
Weinberg et al.

(10) Patent No.: US 7,681,125 B2
(45) Date of Patent: Mar. 16, 2010

(54) CONDITIONAL TEXT PUBLICATION SYSTEM AND METHOD

(75) Inventors: Paul Weinberg, Los Angeles, CA (US); David Brookler, Los Angeles, CA (US); Mark Hanson, Los Angeles, CA (US)

(73) Assignee: SAP, AG, Walldorf (DE)

( * ) Notice: Subject to any disclaimer, the term of this patent is extended or adjusted under 35 U.S.C. 154(b) by 737 days.

(21) Appl. No.: 11/556,990

(22) Filed: Nov. 6, 2006

(65) Prior Publication Data

US 2008/0109754 A1 May 8, 2008

(51) Int. Cl.
*G06F 17/00* (2006.01)
(52) U.S. Cl. ..................................... 715/256
(58) Field of Classification Search ............... 715/200, 715/256
See application file for complete search history.

(56) References Cited

U.S. PATENT DOCUMENTS

| 6,697,821 B2 * | 2/2004 | Ziff et al. ................ 707/104.1 |
| 7,454,701 B2 * | 11/2008 | Graeber ........................ 715/267 |
| 2001/0044813 A1 | 11/2001 | Frank |
| 2002/0184050 A1 | 12/2002 | Papageorge |
| 2003/0110186 A1 | 6/2003 | Markowski |
| 2003/0145281 A1 | 7/2003 | Thames |
| 2004/0095372 A1 * | 5/2004 | Berry et al. .................. 345/713 |
| 2004/0183695 A1 * | 9/2004 | Ruokangas et al. ......... 340/945 |
| 2004/0193439 A1 * | 9/2004 | Marrott ......................... 705/1 |
| 2005/0044410 A1 * | 2/2005 | Yan ............................. 713/201 |
| 2005/0050464 A1 * | 3/2005 | Vasey .......................... 715/517 |
| 2006/0036612 A1 | 2/2006 | Harrop |
| 2006/0184894 A1 * | 8/2006 | Daniels et al. .............. 715/783 |
| 2006/0190816 A1 * | 8/2006 | Vasey .......................... 715/519 |
| 2006/0271858 A1 * | 11/2006 | Yolleck et al. .............. 715/738 |

OTHER PUBLICATIONS

Croft et al., A Loosely-Coupled Integration of a Text Retrieval System and an Object-Oriented Database System, ACM 1992, pp. 223-232.*
Gravano et al., Text Joins in an RDBMS for Web Data Integration, ACM May 2003, pp. 90-101.*
Voisard, Designing and Integrating User Interfaces fo Geographic Database Applications, ACM 1994, pp. 133-142.*

* cited by examiner

*Primary Examiner*—Cong-Lac Huynh
(74) *Attorney, Agent, or Firm*—Dalina Law Group, P.C.

(57) ABSTRACT

A conditional text publication system and method. Conditional text publication allows for the publication of text that varies based on data values associated with the text. More specifically, allows for the inclusion and exclusion of text to or from a publication based on clauses such as conditional clause, functions such as database functions, and operators such as mathematical, logical and set operators that utilize selectors such as fields, attributes, validations, families and other entities associated with data in a database.

20 Claims, 9 Drawing Sheets

CONDITIONAL TEXT PUBLICATION SYSTEM AND METHOD

BACKGROUND OF THE INVENTION

1. Field of the Invention

Embodiments of the invention described herein pertain to the field of computer systems. More particularly, but not by way of limitation, one or more embodiments of the invention provide a conditional text publication system and method.

2. Description of the Related Art

Conditional text publication allows for the publication of text that varies based on data values associated with the text. There are no known conditional text publication systems that allow for the varying of text based on underlying data values associated with a publication. Known systems simply publish text that merely includes data values from a database, via reference embedding. In these systems, data values from a database are simply inserted into published text without using the values to determine the exact text to publish. For example, there are no known systems that apply clauses, functions, operators and selectors on a database to determine what text to include or exclude from a publication based on the data to be published. For instance, a table of products to be published in a product catalog is merely published with the values of the products. There is no known system that determines if there is a unique product in a product table that would indicate that text associated with the unique item should be included in a publication that includes the product table.

For the case of a product catalog, reference embedding functionality simply allows for the import of data values for a group of products into a table format. Generally, when publishing a product catalog, items that are similar may be considered a family of associated products that are published together in this manner. When items in a table for example have different characteristics, current solutions are incapable of adding or altering text based on these characteristics and hence generic table formatted data is published. The table so published may then fail to include information related to particular products and hence may result in improper purchasing and higher customer support requirements.

For example, when publishing a catalog having families of related parts, there are no known solutions that allow for conditional publication of text based on the characteristics of items in the family. If one member of a family of products such as pipe is plastic and the rest of the members of the family metal, known solutions simply publish text that is generic to the entire family without the ability to present text that notifies the reader of other items that the reader may wish to purchase. In this case a user would be well informed to purchase plastic pipe glue when purchasing the plastic pipe. Current systems are incapable of conditionally publishing text associated with a product having characteristics that set it apart from other members of the family.

Text based documents may be published to multiple media types, for example print and markup, e.g., HTML. Formatting a single document for multiple media types is time consuming and requires extensive maintenance to ensure proper formatting when text changes. For example, each published text associated with each document for each media type must be checked to verify that the text change produces valid formatting for each media type. There are no known systems that allow for conditional text publication that is then rendered in different media types. Publishing text for alternate media types using existing technology requires modifying the text to fit a required output format for a given media type. Current systems that perform this function are generally hardcoded and when a particular piece of text changes, all target media publications must be manually adjusted for each media output type. When adding a multiple media requirement to the text maintenance work flow, conditional text changes multiply the amount of work by the amount of supported media types.

Hence known systems generally provide stagnant and generic data due to the complexities of maintaining and customizing data for families having data with unique characteristics. For at least the limitations described above there is a need for a conditional text publication system.

SUMMARY OF THE INVENTION

One or more embodiments of the invention provide a conditional text publication system and method. Conditional text publication allows for the publication of text that varies based on data values associated with the text. More specifically, conditional text publication embodiments detailed herein allow for the inclusion and exclusion of text to or from a publication based on clauses, functions and operators that utilize selectors such as fields, attributes, validations, families and other entities associated with data in a database.

Clauses for example may include "if" and "else" functionality which in one or more embodiments of the invention are in the form of "choose" and "otherwise". Clauses allow conditional text publication by delimiting areas where conditional text may be entered and by providing a framework in which to enter functions, operators and selectors. Clauses determine which conditional text is ultimately published based on the underlying data values in a database that are accessed by the selectors and utilized by operators and functions. Although "choose" and "otherwise" are illustrated herein, one skilled in the art will recognize that any type of logic element may be utilized as a clause in an embodiment of the invention so long as the clause provides an area in which to place operators and functions that results in a Boolean decision as to whether to include or exclude text contained in the clause.

Functions may include any set or subset functions that take at least one parameter and return a result including "min", "max", "count" of records, "countNotNull", e.g., non-null number of records, "countNull", "countDistinct", e.g., the number of distinct records, "countInSet", e.g., the number of elements in a set found in the records, "at", e.g., the value of the data at a given index, or any other function that may be applied to the selectors such as fields, attributes, validations or any other information associated with a database. One skilled in the art will recognize that any function may be utilized in an embodiment of the invention and that the list detailed herein is exemplary only.

Operators may include any set or subset of mathematical, logical, string, set or bitwise operators or any other operators that return a value that can be mapped to a Boolean value through any known mechanism such as "equal", "notEqual", "greaterThan", "lessThan", "greaterOrEqual", "lessOrEqual", "and", "not", "or", "allEqualTo", "allInSet", "allNull", "allSame", "allSet", "has", "hasAll" or any other operator. One skilled in the art will recognize that any operator that takes one or more operands as input may be utilized in an embodiment of the invention and that the list detailed herein is exemplary only.

Selectors may include fields, attributes or validations that designate the source of information to supply to operators, functions and clauses to obtain conditional text. A field selector designates the data in a field to obtain. Attributes are data elements that are not common to all records and as such do not utilize fields for all records even if a record does not utilize the attribute. Attributes may be associated with a family of records, for example all of the records associated with a product and manufacturer. In this case, an attribute for color printers that is not common to black and white printers may be "color type" which may indicate the type of color technology employed by the printer. As this attribute is not common to all fields in a product database, it is more efficient to store the attributes in a separate table that is associated with a given product and manufacture for example. An attribute selector designates the attribute to obtain. Validations may be associated with given families or records and may utilize logic that determines if a particular record is valid or not. Validations may be utilized for searching, for example to find all records that are invalid according to a particular Boolean test validation. Validations may be used as selectors in that records that either pass or fail a validation may be selected for use with functions, operators and clauses in determining the conditional text to output for a given publication based on the validity of underlying data records.

Additionally, text input may include constant text that is published in an unaltered manner or conditional reference text that is obtained via a selector. Text may be tagged with a style that signifies desired output characteristics to be applied to the text. The styles may include "copy", i.e., regular text, "caption", "part number" or any other type of style. The style in one or more embodiments of the invention is output device independent since multiple media types may be targeted with a single publication. In this embodiment, device specific mappings for the styles may be utilized to target a particular output media type and/or physical device so that the styles are properly displayed to the reader of the publication.

Entry of clauses, functions, operators and text with legal value lists that are based on graphical user interface components minimizes errors in generating conditional text. By allowing for user input that is constrained, syntax and logic errors are eliminated. In this manner, maintenance of the data is more efficient and more flexible. Hence, adding conditional text for unique products in an associated group of products is rapid.

DETAILED DESCRIPTION OF THE INVENTION

One or more embodiments of the invention provide a conditional text publication system and method. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
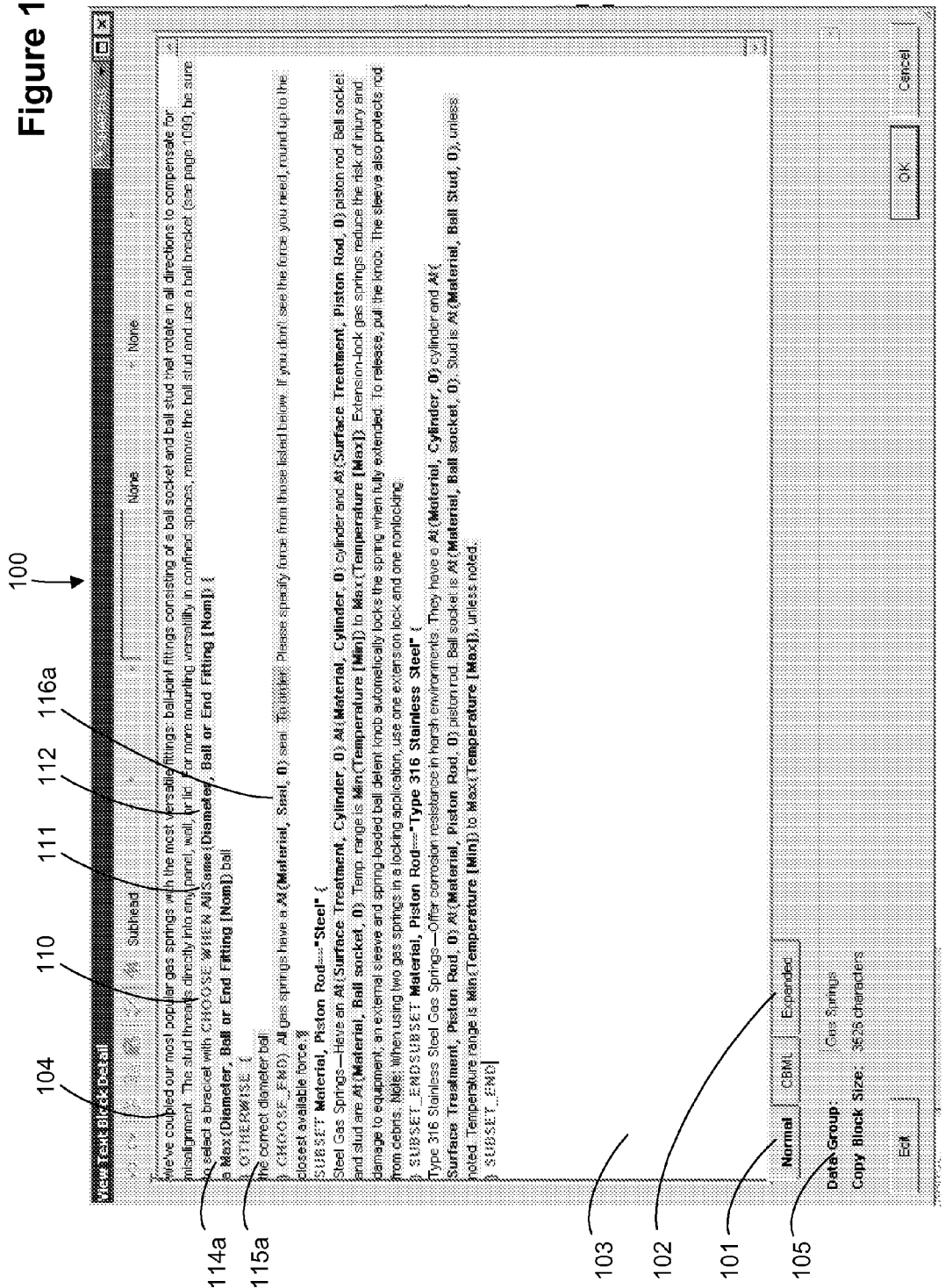
FIG. 1 illustrates an embodiment of a text detail window of a conditional text publication system.
Figure 2:
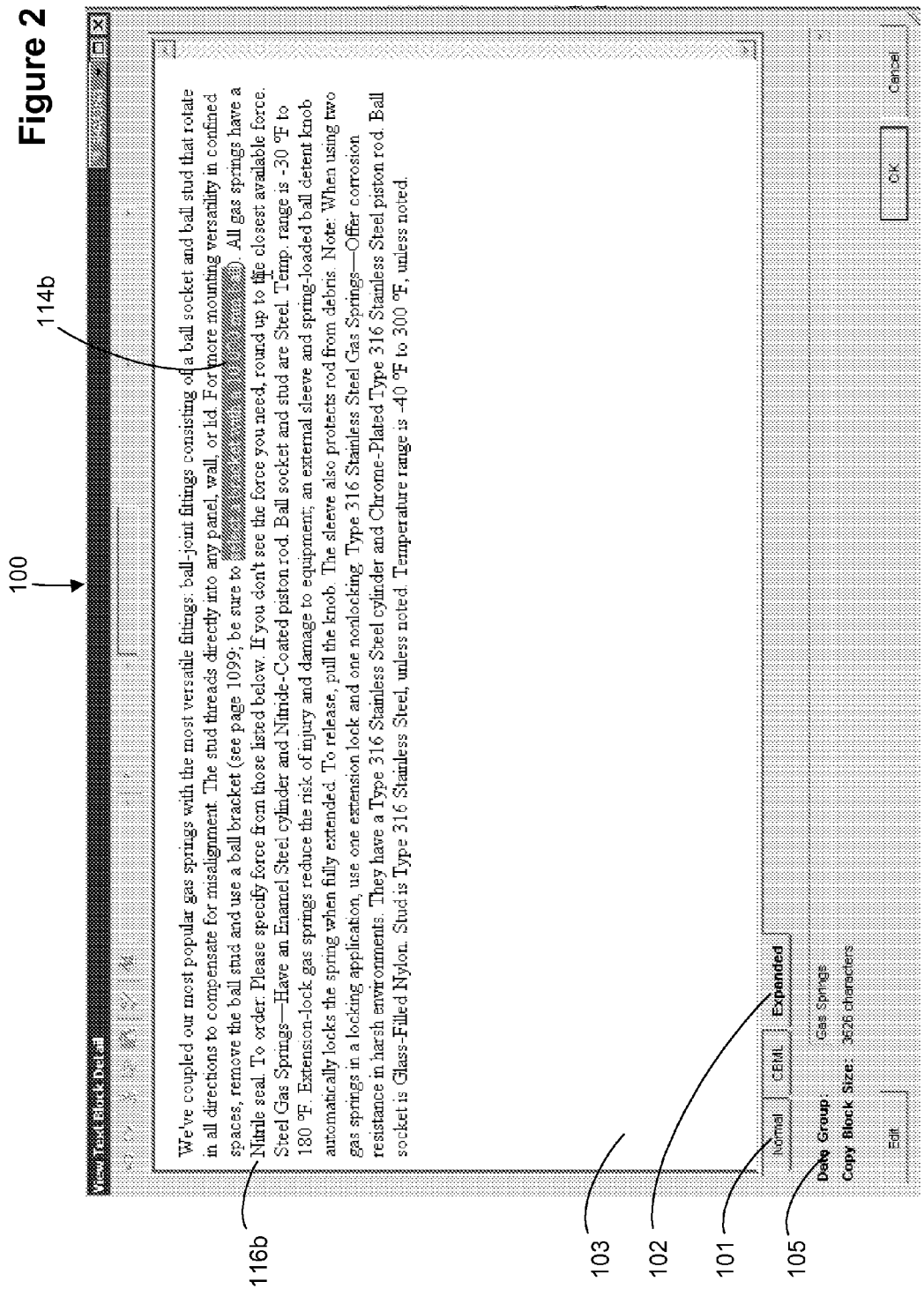
FIG. 2 illustrates an embodiment of an expanded text window of a conditional text publication system.

FIG. 1 illustrates an embodiment of text detail window 100 of an embodiment of the invention. Text detail window 100 displays text detail associated with data group 105, in this example, "gas springs". Text detail window 100 is presented when text detail tab 101 is asserted. The published text that results from asserting expanded text tab 102 is shown in FIG. 2. In FIG. 1, text detail entry area 103 allows for text input 104 which may include conditional elements such as clause 110, operator 111 and selector 112. In this example, clause 110 is a "CHOOSE" clause that utilizes operator 111, here a "All-Same" clause that returns a Boolean TRUE value when the "Diameter" and nominal "Ball or End Fitting" sizes are all the same for records associated with data group 105, here "gas springs". When clause 110 is asserted as a result of all elements of data group 105 having the same diameter or ball or end fitting, then text block 114a is evaluated and published. Text block 114a uses "a" and a function "max" applied to the diameter or ball or end fitting to construct the resulting text. The resulting text in this case is shown in FIG. 2 as resulting text 114b, here "10.000 mm ball". If clause 110 was not asserted, i.e., all of the values in data group 105 did not have the same diameter or ball or end fitting size, then text block 115a would be published. Text block 115a, here "the correct diameter ball" is a string of constant text that does not include conditional text generation as there is no selector utilized in text block 115a to obtain data on which to use an operator or function. Function selector combination 116a selects the result at index zero of the material used for a seal.

FIG. 2 illustrates an embodiment of expanded text window 200 of an embodiment of the invention. When expanded text tab 102 is asserted, text input 104 including any conditional text derived from underlying data in a database associated with data group 105 is presented. In this example, resulting text 114b which is derived from text block 114a shown in FIG. 1 is presented. Resulting text 116b shows that function selector combination 116a presents a "nitrite seal" text string when evaluated. If the data in the database associated with material was a different material for a different group of existing records, then that type of material would be presented in expanded text window 200. Since text input 104 may be utilized for many different data groups of related items, creation of one text detail may be utilized for all of the data groups, which is an enormous savings of time. When a description or text input changes for a group of related items, the publication may be updated by updating only one text detail window and regenerating the publication. This lowers the maintenance requirements by a large factor when the published data is associated with many data groups.

Figure 3:
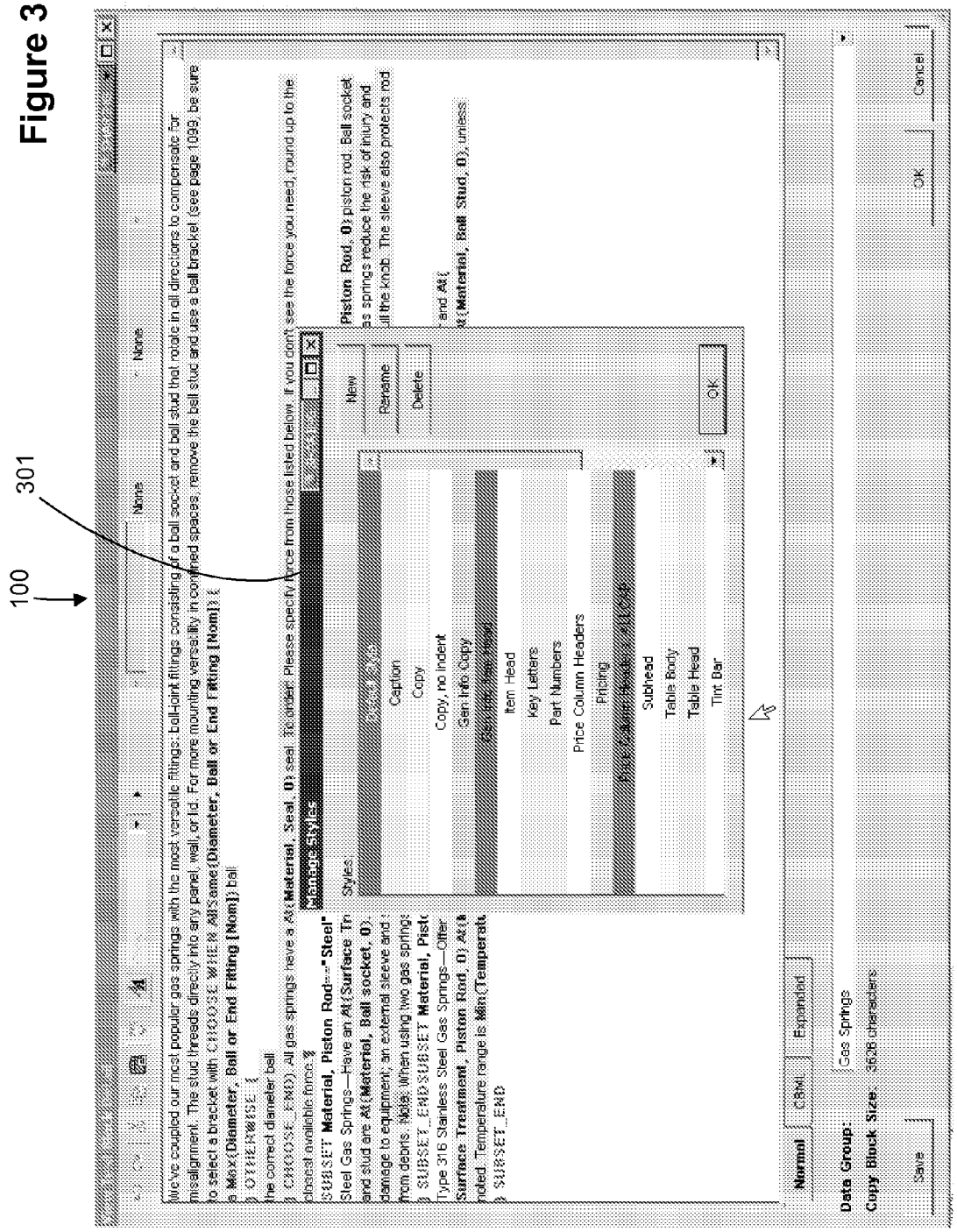
FIG. 3 illustrates an embodiment of a style window of a conditional text publication system.

FIG. 3 illustrates an embodiment of style window 301 in an embodiment of the invention. Shown in style window 301 is a list of style types that are shown in one or more embodiments of the invention in different colors to visually represent different areas of style in text detail window 100. Although this style window lists a number of different styles, it will be apparent to one skilled in the art that other styles may be included. In one or more embodiments, the styles applied are further modified by the output device type or media output type to generate the final publication. In this manner, logical style types may represent vastly different paragraph, font and size settings based on the actual device type or media output type used to view the resulting publication. By clicking and dragging on text, clauses, functions, operators and selectors in text detail entry area 103 and asserting a particular style using style window 301, the resulting publication obtains the asserted style.

Figure 4:
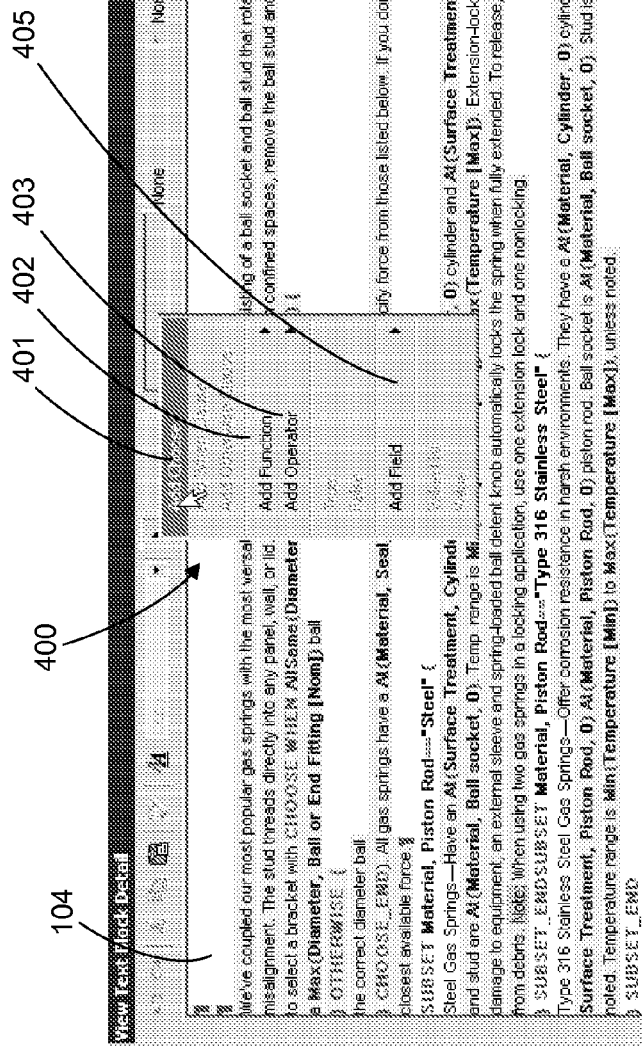
FIG. 4 illustrates an embodiment of a popup configured to accept a selection of a clause, function, operator or selector.
Figure 5:
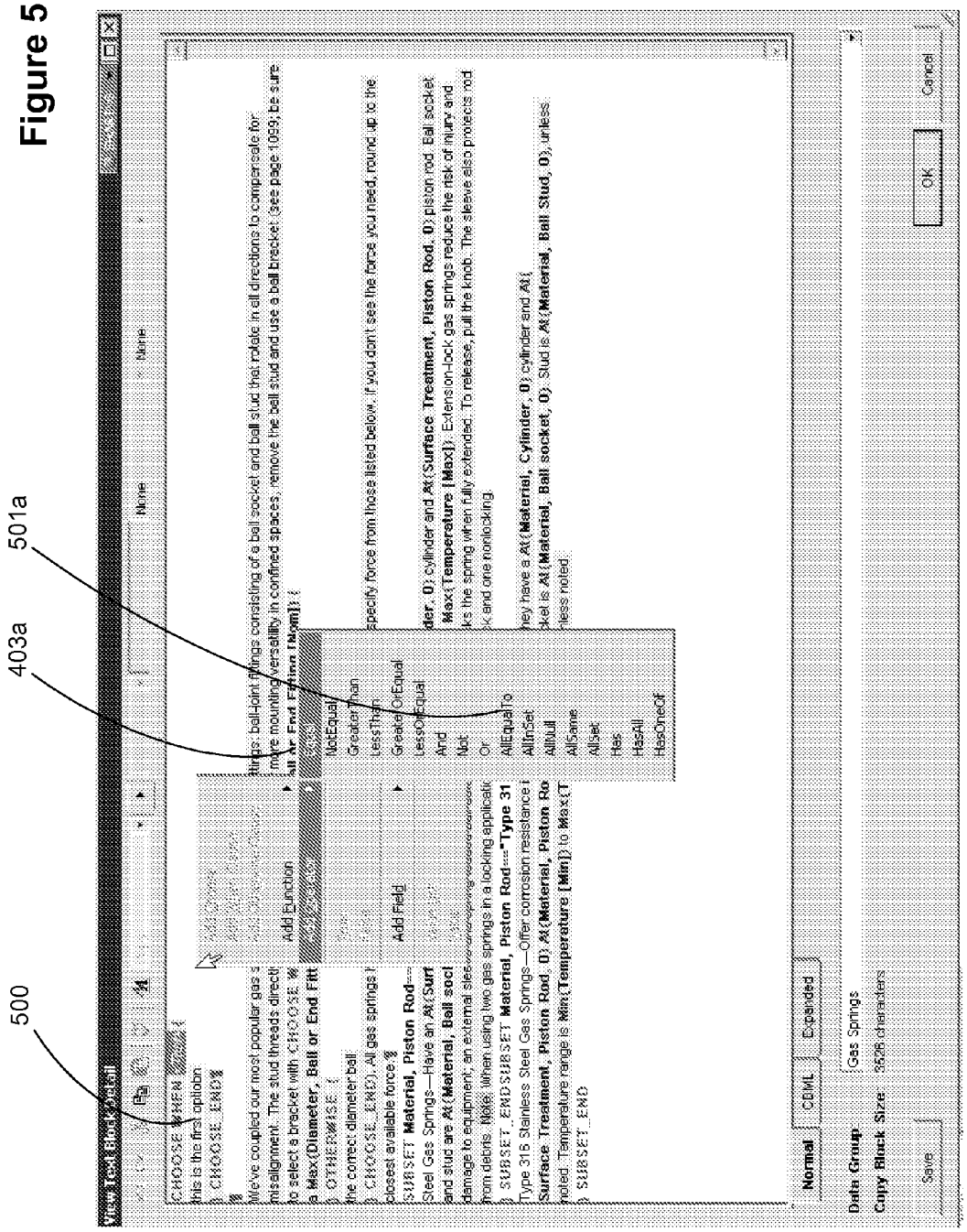
FIG. 5 illustrates an embodiment of an operator menu.

FIG. 4 illustrates an embodiment of popup 400 configured to accept a selection of clause menu 401, function menu 402, operator menu 403 or selector 405. Optional menu items include Boolean value menu items 404 and value and value list menu items 406. By asserting a desired clause in popup 400, the clause is inserted into input text 104 as shown in FIG. 5 as clause 500. By asserting an operator, function or selector, the operator, function or selector is inserted into input text 104. See FIGS. 5-7 for examples of operators, functions and selectors. Clauses for example may include "if" and "else" functionality which in one or more embodiments of the invention are in the form of "choose" and "otherwise". Clauses allow conditional text publication by delimiting areas where conditional text may be entered and by providing a framework in which to enter functions, operators and selectors. Clauses determine which conditional text is ultimately published based on the underlying data values in a database that are accessed by the selectors and utilized by operators and functions. Although "choose" and "otherwise" are illustrated herein, one skilled in the art will recognize that any type of logic element may be utilized as a clause in an embodiment of the invention so long as the clause provides an area in which to place operators and functions that results in a Boolean decision as to whether to include or exclude text contained in the clause.

FIG. 5 illustrates an embodiment of operator menu expanded into operator sub-menu 403a. Operators may include any set or subset of "equal", "notEqual", "greater-Than", "lessThan", "greaterOrEqual", "lessOrEqual", "and", "not", "or", "allEqualTo", "allInSet", "allNull", "allSame", "allSet", "has", "hasAll" or any other operator. Bitwise operators for example may be utilized with bit-field entities or bit slices associated with a database to greatly speed operations if desired for example.

Figure 6:
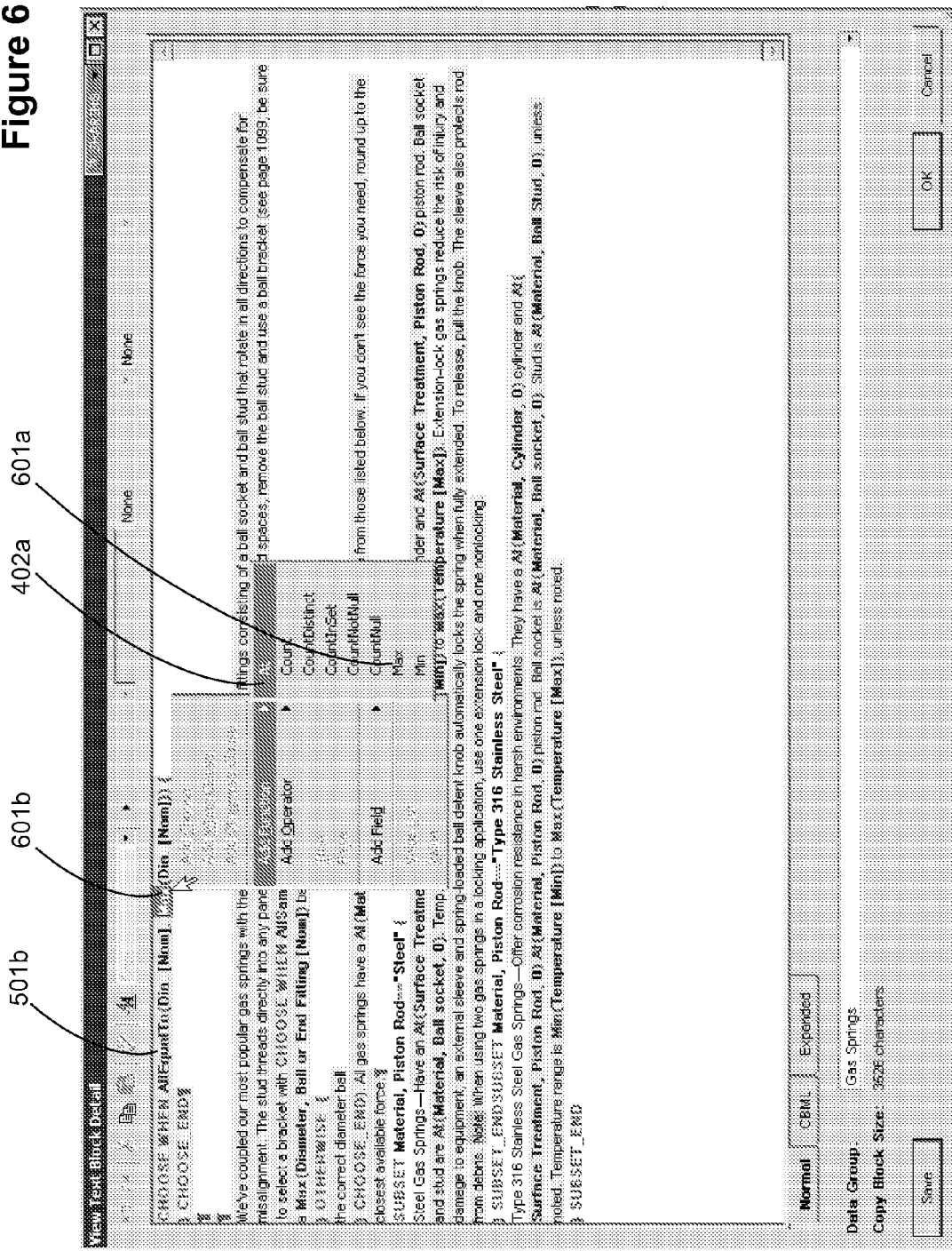
FIG. 6 illustrates an embodiment of a function menu.

FIG. 6 illustrates an embodiment of a function menu expanded into function sub-menu 402a. Functions may include any set or subset of "min", "max", "count" of records, "countNotNull", e.g., non-null number of records, "count-Null", "countDistinct", e.g., the number of distinct records, "countInSet", e.g., the number of elements in a set found in the records, "at", e.g., the value of the data at a given index, or any other function that may be applied to the selectors such as fields, attributes, validations or any other information associated with a database.

Figure 7:
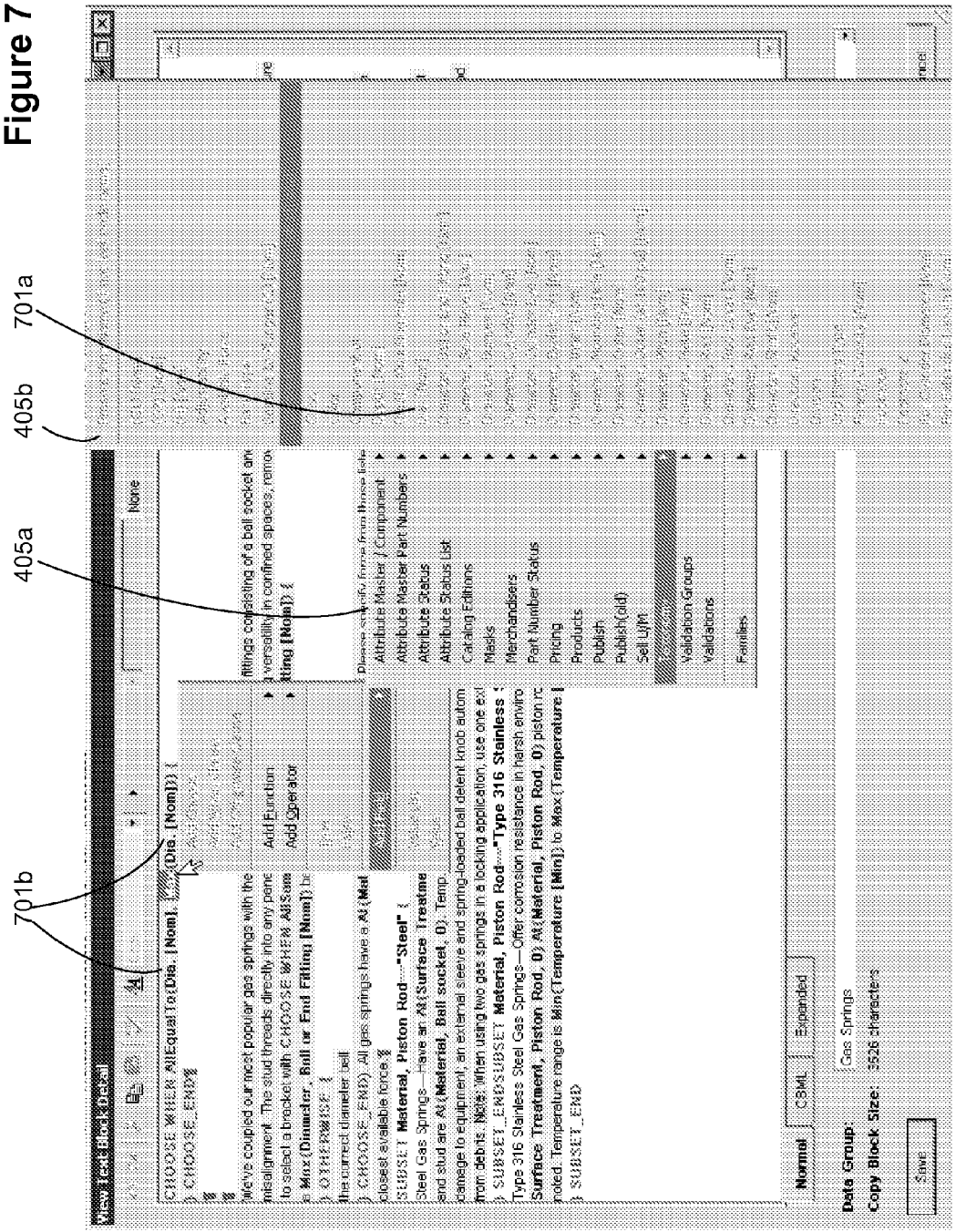
FIG. 7 illustrates an embodiment of a selector menu.

FIG. 7 illustrates an embodiment of a selector menu expanded into selector sub-menu 405a. Selectors may include fields, attributes or validations that designate the source of information to supply to operators, functions and clauses to obtain conditional text. A field selector designates the data in a field to obtain. Attributes are data elements that are not common to all records and as such do not utilize fields for all records even if a record does not utilize the attribute. Attributes may be associated with a family of records, for example all of the records associated with a product and manufacturer. In this case, an attribute for color printers that is not common to black and white printers may be "color type" which may indicate the type of color technology employed by the printer. As this attribute is not common to all fields in a product database, it is more efficient to store the attributes in a separate table that is associated with a given product and manufacture for example. In this particular case a separate attribute table that is indexed by field values which define a family allow for information to be included with records without adding extra fields to a main data table of a database that would result in large amounts of wasted space for records that are not associated with the attribute. An attribute selector designates the attribute to obtain. Validations may be associated with given families or records and may utilize logic that determines if a particular record is valid or not. Validations may be utilized for searching, for example to find all records that are invalid according to a particular Boolean test validation. Validations may be used as selectors in that records that either pass or fail a validation may be selected for use with functions, operators and clauses in determining the conditional text to output for a given publication based on the validity of underlying data records.

Figure 8:
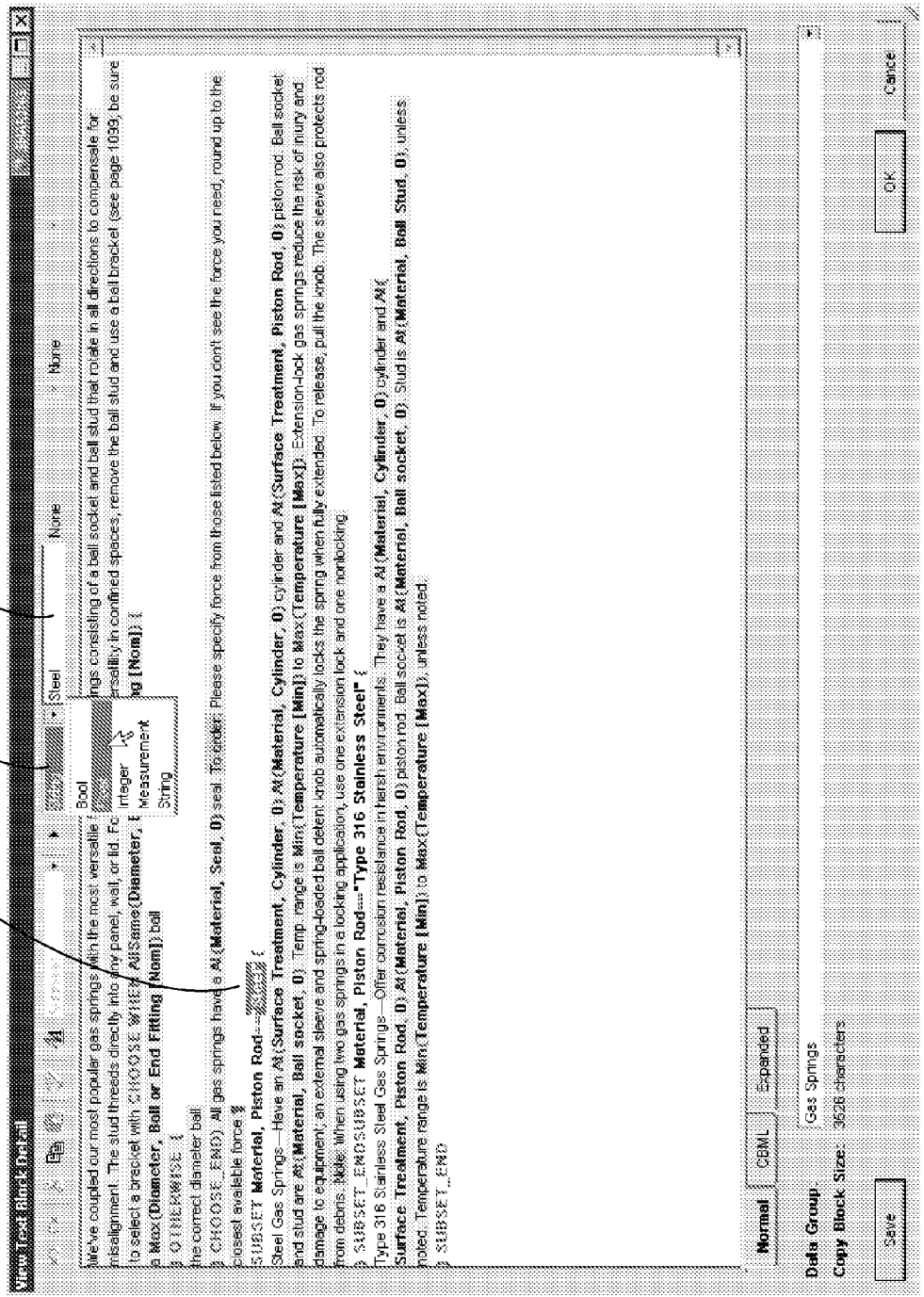
FIG. 8 illustrates an embodiment of a value input user interface area.

FIG. 8 illustrates an embodiment of a value input user interface area including value type list 800a and value entry field 800b. In this example, value 800c is set to a string of value "steel" as per value type list 800a and value entry field 800b. In other cases, text values that exist in the database may be selected using value list 406 for example so that no typing is required to select values that actually exist in the database. In other embodiments of the invention, the value and value list data may be imported for example.

Figure 9:
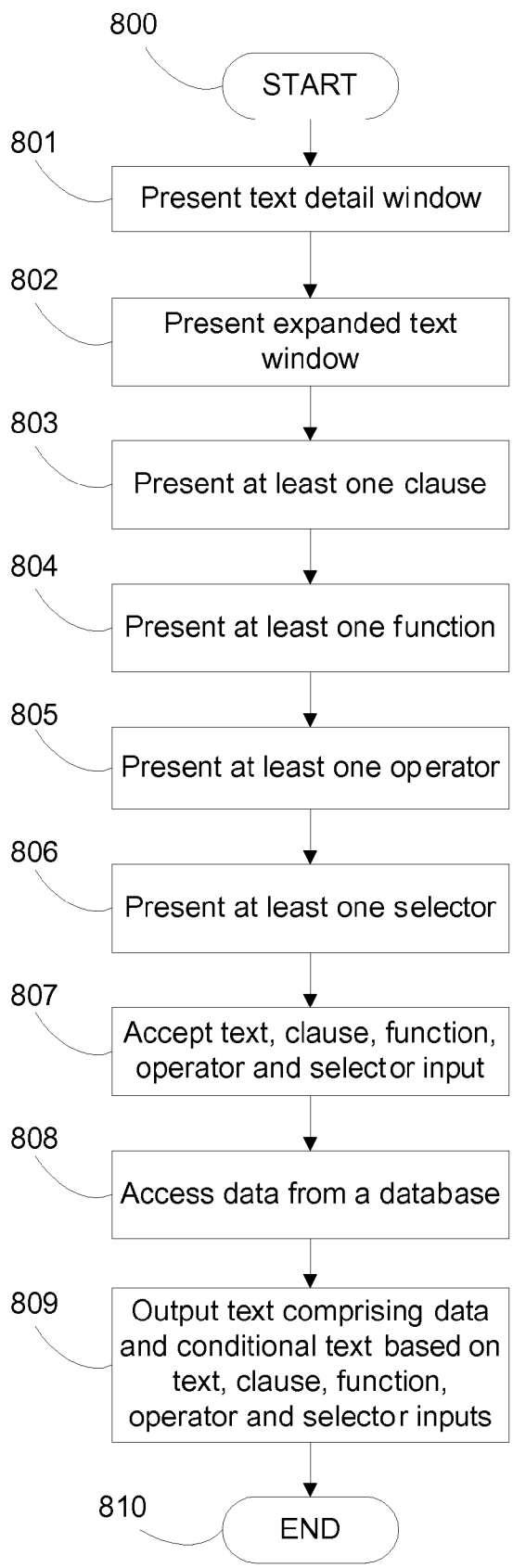
FIG. 9 illustrates an embodiment of a method of operation for a conditional text publication system.

FIG. 9 illustrates an embodiment of a method of operation for a conditional text publication system. Processing starts at 800, and a text detail window is presented at 801. The text detail window shows text and conditional blocks that allow for conditional text publication. An expanded text window is presented at 802. The expanded text window presents text that has been evaluated and substituted for that represents the publication that will result based on the underlying data associated with the publication. At least one clause is presented at 803. The clause may be in any form so long as conditional insertion of text occurs. At least one function is presented at 804. A function may include any function that operates on the underlying data in the database and may include any function accessible by the system. At least one operator is presented at 805. An operator may include any mathematical, logical, string, set or bitwise operator or any other operator that is accessible by the system to operate on underlying data in the database. At least one selector is presented at 806. A selector may access any data associated with a database and may include fields, attributes, validations, or any other element or derived element associated with data in the database. The system accepts text, clause, function, operator and selector input at 807. The entries are presented in the text detail window and the expanded text window when either of these windows is displayed. Data is accessed from the database at 808 and utilized by the various clause, function, operator inputs to determine the appropriate conditional text output. The derived text is output at 809 based on the text, clause, function, operator and selector inputs. Processing ends at 810. Any method of interpreting or compiling the text detail is in keeping with the spirit of the invention and any method may be utilized in producing derived text for publication.

While the invention herein disclosed has been described by means of specific embodiments and applications thereof, numerous modifications and variations could be made thereto by those skilled in the art without departing from the scope of the invention set forth in the claims.

What is claimed is:

1. A computer program product comprising computer readable instruction code executing in a tangible memory medium of a computer, said computer readable instruction code configured to:

present a text detail window in a first screen region of a graphical user interface;

present an expanded text window in a second screen region of said graphical user interface;

present at least one clause in a third screen region of said graphical user interface;

present at least one function a fourth screen region of said graphical user interface;

present at least one operator in a fifth screen region of said graphical user interface;

present at least one selector in a sixth screen region of said graphical user interface;

accept text, clause, function, operator and selector input from a user via said graphical user interface;

access data from a database; and, output text wherein said text comprises said data from said database and conditional text based on said text, clause, function, operator and selector input.

2. The computer program product of claim 1 wherein said function is selected from the group consisting of at, count, count distinct, count in set, count not null, count null, max and min.

3. The computer program product of claim 1 wherein said operator is selected from the group consisting of equal, not equal, greater than, less than, greater or equal, less or equal, and, not, or, all equal to, all in set, all null, all same, all set, has, "has all" and "has one of".

4. The computer program product of claim 1 wherein said selector is selected from the group consisting of field, attribute, validation, taxonomy, family.

5. The computer program product of claim 1 further comprising:

present a style window in a seventh screen region of said graphical user interface.

6. The computer program product of claim 1 further comprising:

present a style window in a seventh screen region of said graphical user interface and wherein said style window is configured to apply a logical style to a conditional string wherein said logical style represents different paragraph formats and different fonts and different sizes with respect to each supported output media type.

7. The computer program product of claim 1 further comprising:

present a value input user interface area in an eighth screen region of said graphical user interface.

8. A computer-readable storage medium comprising:

a set of instructions for a computer having a graphical user interface to execute, said computer configured to generate conditional text output by causing said set of instructions to:

present a text detail window in a first screen region of a graphical user interface;

present an expanded text window in a second screen region of said graphical user interface;

present at least one clause in a third screen region of said graphical user interface;

present at least one function a fourth screen region of said graphical user interface;

present at least one operator in a fifth screen region of said graphical user interface;

present at least one selector in a sixth screen region of said graphical user interface;

accept text, clause, function, operator and selector input from a user via said graphical user interface;

access data from a database; and, ouput text wherein said text comprises said data from said database and conditional text based on said text, clause, function, operator and selector input.

9. The computer readable storage medium of claim 8 wherein said function is selected from the group consisting of at, count, count distinct, count in set, count not null, count null, max and min.

10. The computer readable storage medium of claim 8 wherein said operator is selected from the group consisting of equal, not equal, greater than, less than, greater or equal, less or equal, and, not, or, all equal to, all in set, all null, all same, all set, has, "has all" and "has one of".

11. The computer readable storage medium of claim 8 wherein said selector is selected from the group consisting of field, attribute, validation, taxonomy, family.

12. The computer readable storage medium of claim 8 further comprising:

present a style window in a seventh screen region of said graphical user interface.

13. The computer readable storage medium of claim 8 further comprising:

present a style window in a seventh screen region of said graphical user interface and wherein said style window is configured to apply a logical style to a conditional string wherein said logical style represents different paragraph formats and different fonts and different sizes with respect to each supported output media type.

14. The computer readable storage medium of claim 8 further comprising:

present a value input user interface area in an eighth screen region of said graphical user interface.

15. A system for generating conditional text output comprising:

means for presenting a text detail window in a first screen region of a graphical user interface;

means for presenting an expanded text window in a second screen region of said graphical user interface;

means for presenting at least one clause in a third screen region of said graphical user interface;

means for presenting at least one function a fourth screen region of said graphical user interface;

means for presenting at least one operator in a fifth screen region of said graphical user interface;

means for presenting at least one selector in a sixth screen region of said graphical user interface;

means for accepting text, clause, function, operator and selector input from a user via said graphical user interface;

means for accessing data from a database; and, means for outputting text wherein said text comprises said data from said database and conditional text based on said text, clause, function, operator and selector input.

16. The system of claim 15 wherein said function is selected from the group consisting of at, count, count distinct, count in set, count not null, count null, max and min.

17. The system of claim 15 wherein said operator is selected from the group consisting of equal, not equal, greater than, less than, greater or equal, less or equal, and, not, or, all equal to, all in set, all null, all same, all set, has, "has all" and "has one of".

18. The system of claim 15 wherein said selector is selected from the group consisting of field, attribute, validation, taxonomy, family.

19. The system of claim 15 further comprising:

means for presenting a style window in a seventh screen region of said graphical user interface and wherein said style window is configured to apply a logical style to a conditional string wherein said logical style represents different paragraph formats and different fonts and different sizes with respect to each supported output media type.

20. The system of claim 15 further comprising:

means for presenting a value input user interface area in an eighth screen region of said graphical user interface.

\* \* \* \* \*